Patented Nov. 15, 1949

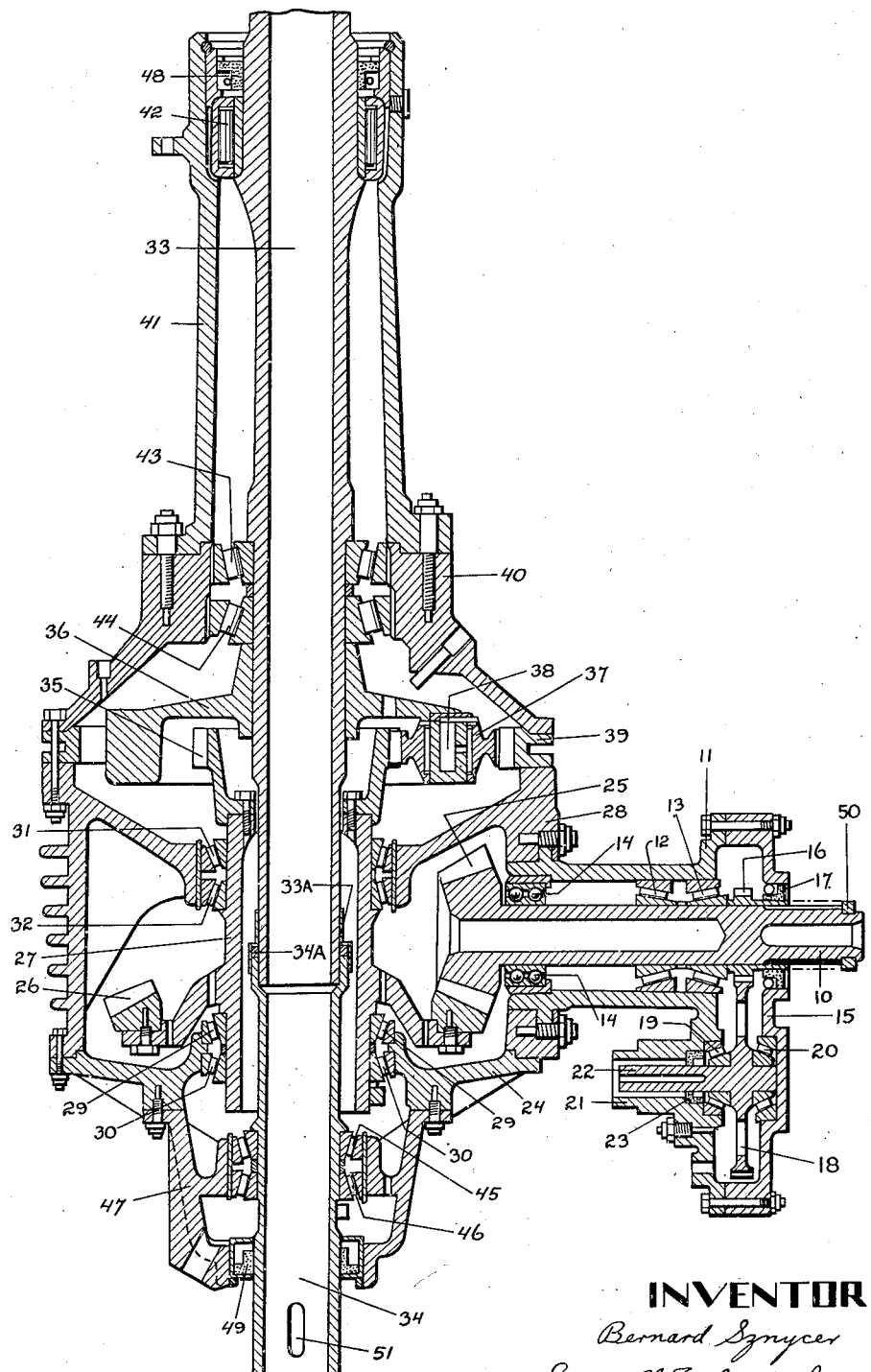

2,487,952

UNITED STATES PATENT OFFICE 2,487,952

POWER TRANSMISSION

Bernard Sznycer, New York, N. Y., assignor to Intercity Airline Company, Montreal, Quebec, Canada Application October 30, 1948, Serial No. 57,561
In Canada July 12, 1946

1 Claim. (Cl. 74—801)

The invention relates to improvements in power transmission as described in the present specification and illustrated in the accompanying drawings that form a part of the same.

The invention consists essentially of improvements in power transmission as pointed out broadly and specifically in the claims for novelty following a description in detail of an acceptable form of the invention.

The objects of the invention are to devise a power transmission for helicopters in which the drive shaft to the rotors is at right angles to the drive shaft from the power source and where the control swashplate is mounted below the transmission; to produce a power transmission which will reduce vibration caused by the rotors being connected directly with the engine; to provide a power transmission which will enable the use of a vertical shaft either in one piece or in sections for driving the rotors; to devise a power transmission which will eliminate torque and strain on the engine and engine drive shaft; to construct a power transmission having the shaft to which the swash plate is attached rotating at the same speed as the rotor head; to produce a power transmission which effects positive action between the engine and the rotors; to produce a power transmission simple in construction, easy to assemble and having the various parts readily accessible for inspection and quick repair; and generally to provide a power transmission durable in construction, practical in operation and efficient for its purpose.

In the drawings the figure is a sectional plan view of the power transmission.

Like numerals of reference indicate corresponding parts in the various figures.

Referring to the drawings the spiral bevel pinion shaft is indicated by the numeral 10. This pinion shaft is made of any suitable metal and of a predetermined size being journalled in the bevel pinion housing 11 by means of the bearings 12, 13, and 14.

The tachometer drive housing 15 is suitably mounted on the bevel pinion housing 11. The tachometer drive pinion 16 is securely fitted on the spiral bevel pinion shaft 10. The seal 17 is fitted in this housing 15 and around a portion of the tachometer drive pinion 16 providing a means for retaining a lubricant therein. The tachometer drive gear 18 is made of any suitable material and of a predetermined size being journalled in the tachometer drive housing 15 by means of the bearing 19, and also being journalled in the bevel pinion housing 11 by means of the bearing 20. The tachometer shaft attachment 21 is a threaded portion protruding from the bevel pinion housing 11. The shaft 22 which is a portion of the drive gear 18 is suitably adapted to facilitate making a connection with same. The seal 23 is fitted in the bevel pinion housing 11 and around a portion of the shaft 22 providing means for retaining a lubricant therein.

The bevel pinion housing 11 is suitably secured to the centre housing 28.

The bevel gear 25 on the spiral bevel pinion shaft 10 engages with the spiral bevel crown gear 26 providing a means of transforming the motion to this crown gear 26 which is at right angles to the bevel gear 25. The crown gear 26 is made of any suitable material and of a predetermined size being fixedly secured to the sleeve 27.

The centre housing 28 is fixedly secured to the bevel pinion housing 11 and to the bottom housing 24. The sleeve 27 is rotatably mounted by means of the bearing 29 and 30 in the bottom housing 24, and also by means of the bearings 31 and 32 in the centre housing 28.

The driven or vertical shaft consists of two shaft sections 33 and 34 both of which are hollow. The upper shaft section 33 has a retaining collar 33A fixedly secured around the lower portion thereof. The upper end of the lower shaft section 34 is enlarged at the upper end thereof to fit over the lower end of the upper shaft section 33. A resilient spacer ring 34A is accommodated within the retaining collar 33 and the upper end of the lower shaft section 34 abuts this resilient spacer ring thereby forming a flexible and resilient coupling between the two shaft sections.

While these shaft sections 33 and 34 extend through the hollow portion of the sleeve 27 they do not support this sleeve in any way, this being accomplished by means of the bearings 29, 30, 31, and 32 as previously described.

The sun gear 35 is fixedly secured and supported on the sleeve 27. The planetary pinions 37 are rotatably mounted on pins 38. These pins being suitably mounted on the planetary gear cage 36. An internal gear 39 is suitably secured to the upper housing 40 and the centre housing 28. The sun gear 35 engages the planetary pinions 37 rotating the same. The planetary pinions 37 engage the internal gear 39 which is stationary in the housing 28 and 40. As these planetary pinions 37 which are mounted on the planetary gear cage 36 revolve they travel around inside the internal gear 39, thus turning the shaft section 33 with respect to the housings of the power transmission.

The extension housing 41 is of a predetermined size and suitably secured to the upper housing 40.

The shaft section 33 is rotatably mounted by means of the bearing 42 in the extension housing 41 and also by means of the bearings 43 and 44 in the upper housing 40. The shaft section 34 is rotatably mounted by means of the bearings 45 and 46 in the lower seal housing 47 which, in turn, is suitably secured to the bottom housing 24.

The seal 48 is fitted in the extension housing 41 and around a portion of the shaft section 33. The seal 49 is fitted in the lower seal housing 47 and around a portion of the shaft section 34. These seals 48 and 49 providing means for retaining a lubricant within the power transmission.

The spiral bevel pinion shaft 10 is provided with a locknut 50 on the outer end thereof, facilitating making a connection with the power source.

The shaft section 34 has a slot 51 towards the lower end of same providing means for connection to a swashplate.

It will be seen from the foregoing that a simple and efficient power transmission has been devised for helicopters that will eliminate strain and direct vibration with respect to the power source.

What I claim is:

In a power transmission, a center housing having an upper housing and a bottom housing secured thereto, an extension housing secured to the upper portion of said upper housing, a pinion housing secured to said center housing and extending outward therefrom at right angles thereto, a bevel pinion shaft extending through said pinion housing, said bevel pinion shaft being hollow throughout the greater length thereof, two outer bearings mounted in said pinion housing and rotatably supporting said bevel pinion shaft, a bevel gear integral with said bevel pinion shaft and located on the inner portion thereof, a vertical shaft consisting of an upper shaft section and a lower shaft section, said upper shaft section and said lower shaft section both being hollow, a retaining collar fixedly secured on the outside of said upper shaft section toward the lower end thereof, a resilient spacer accommodated within said retaining collar on said upper shaft section, said lower shaft section having an enlarged portion at the upper end thereof adapted to fit over the lower end of said upper shaft section, the extreme upper end of said lower shaft section extending into said retaining collar and abutting said resilient spacer thereby providing a resilient coupling between said upper shaft section and said lower shaft section, a sleeve extending around the adjoining portions of said upper and said lower shaft sections and being clear of the same, bearings accommodated within said center housing and rotatably supporting said sleeve, a bevel crown gear fixedly supported on said sleeve and being engaged by said bevel pinion gear, a sun gear supported above said sleeve and being fixedly secured thereto, a planetary gear cage fixedly mounted on said upper shaft section, a plurality of planetary pinions rotatably supported by said planetary cage and being engaged by said sun gear, an internal gear fixedly secured between said upper housing and said center housing and being engaged by said planetary pinions as they travel around inside said internal gear, bearings accommodated within the top portion of said extension housing and rotatably supporting the upper portion of said upper shaft section, an upper seal fitted in said extension housing and around a portion of said upper shaft section at the upper end thereof, bearings accommodated within said bottom housing and rotatably supporting said lower shaft section, a lower seal housing secured to the lower portion of said bottom housing and extending around said lower shaft section, a lower seal accommodated within said lower seal housing and engaging the lower portion of said lower shaft section, a tachometer drive housing mounted on said bevel pinion housing at the outer end thereof, a tachometer drive pinion fixedly secured on said bevel pinion shaft, a tachometer drive gear rotatably supported between a portion of said bevel pinion housing, and said tachometer drive gear being engaged by said tachometer drive pinion, a protruding portion extending from the portion of said bevel pinion housing supporting said tachometer drive gear, a shaft extending outward from said tachometer drive gear into said protruding portion on said bevel pinion housing, and an oil seal fitted in said bevel pinion housing and extending around a portion of said shaft of said tachometer drive gear.

BERNARD SZNYCER.

REFERENCES CITED

The following references are of record in the file of this patent:

UNITED STATES PATENTS

| Number | Name | Date |
|---|---|---|
| 1,539,075 | Chilton | May 26, 1925 |
| 1,546,967 | Buehler | July 21, 1925 |
| 1,636,820 | Huck | July 26, 1927 |
| 1,958,788 | Harper | May 15, 1934 |
| 2,147,285 | Double et al. | Feb. 14, 1939 |

FOREIGN PATENTS

| Number | Country | Date |
|---|---|---|
| 400,228 | Great Britain | Oct. 3, 1932 |
| 719,349 | France | Nov. 14, 1931 |